United States Patent [19]

Cho

[11] 3,999,680
[45] Dec. 28, 1976

[54] COOKING UTENSIL

[76] Inventor: Jin Sul Cho, G-3040 W. Bristol Road, Flint, Mich. 48507

[22] Filed: Oct. 30, 1974

[21] Appl. No.: 519,113

[52] U.S. Cl. .............................. 220/366; 220/82 R; 220/85 D; 220/369

[51] Int. Cl.² ........................................ B65D 51/16

[58] Field of Search ............... 220/369, 366, 85 D, 220/85 E, 377, 82 R, DIG. 27

[56] References Cited

UNITED STATES PATENTS

| 871,287 | 11/1907 | Mendal | 126/389 |
|---|---|---|---|
| 1,953,765 | 4/1934 | McCluney | 220/366 |
| 2,559,196 | 7/1951 | Medved | 220/82 R |
| 2,629,511 | 2/1953 | Gosnell | 220/369 |
| 2,836,462 | 5/1958 | Wenner | 220/366 |
| 2,867,352 | 1/1959 | Kawano | 220/369 |
| 3,708,086 | 1/1973 | Colato | 220/366 |
| D168,026 | 10/1952 | Fornoff | 220/369 |

Primary Examiner—George E. Lowrance
Assistant Examiner—Allan N. Shoap
Attorney, Agent, or Firm—Basile, Weintraub and VanOphem

[57] ABSTRACT

A cooking utensil, such as a frying pan for reducing splattering comprises an open top base member having a bottom and an upstanding sidewall integrally formed therewith. The sidewall is provided with a plurality of apertures disposed therearound. A lid which seatingly engages the base member is provided with a central vent.

7 Claims, 3 Drawing Figures

COOKING UTENSIL

BACKGROUND OF THE INVENTION

1. Field of the Invention

The present invention relates to cooking utensils. More particularly, the present invention relates to frying pan cooking utensils for preparing fried foods. Even more particularly, the present invention pertains to frying pans for the preparation of fried foods having means for preventing the splattering of grease.

2. Prior Art

As is known to those skilled in the art, the preparation of fried foods necessitates the use of extremely hot cooking oils and fats. Furthermore, as is known, the hot cooking oils and fats splatter around and out of the utensil in which they are placed. This creates an undue hazard to the utensil user as well as surrounding environs. The problems of grease fires in kitchens as well as severe burns to the user of the utensil, as a result of splattering hot cooking oils and fats, are well documented. Thus, a major safety hazard would be eliminated by providing a cooking utensil for the preparation of fried foods which obviates the problem of splattering cooking oils and greases. Heretofore, there has been a dearth of prior art directed to solving this very real and unnecessary hazard. However, there does exist some relevant prior art.

For example, U.S. Pat. No. 3,141,568 teaches a utensil cover adapted to enshroud most cooking vessels. The cover comprises a box having a vent and a lateral or side slit for inserting a food turner. However, because the cover is substantially a universal cover, it does not engage the cooking vessel in any manner, thereby rendering the device, in many instances, too cumbersome.

U.S. Pat. No. 871,287 teaches a frying pan for use with chimneys wherein apertures are provided in the pan for circulating air therethrough to force the smoke from the pan into the flue of the chimney.

U.S. Pat. No. 2,002,237 teaches a frying pan cover having a plurality of apertures formed therein for permitting moisture to escape from the interior of the pan.

Other relevant prior art is found in U.S. Pat. Nos. 2,299,995; 2,428,839; 832,274; 2,686,608 and 23,429.

It is to be noted, however, that the prior art fails to provide a cooking utensil which provides for the atmospheric cooling of the hot greases while concommitantly providing escapement means for hot gasses.

SUMMARY OF THE INVENTION

In accordance with the present invention there is provided a cooking utensil which obviates the problem of splattering cooking oils and greases. The cooking utensil or frying pan comprises a base member and a lid.

The base member comprises a bottom plate or member and an upstanding side wall integrally formed therewith which cooperate to define an open top base member. The side wall has a plurality of apertures formed therethrough which circulate air into the pan to cool the cooking oils.

A lid or cover member is adapted to seat on the base member. The lid is provided with a vent or opening to permit the escapement of hot air from within the frying pan. The lid, also, includes a lateral opening for inserting therethrough a spatula, spoon or the like to facilitate the turning of frying foodstuffs.

The present invention further contemplates the inclusion of a heating coil into the bottom plate and a rheostatic switch such that an electric frying pan is provided hereby.

For a more complete understanding of the present invention reference is made to the following detailed description and accompanying drawing. In the drawing like reference characters refer to like parts throughout the several views in which:

DESCRIPTION OF THE PREFERRED EMBODIMENTS

Figure 1:
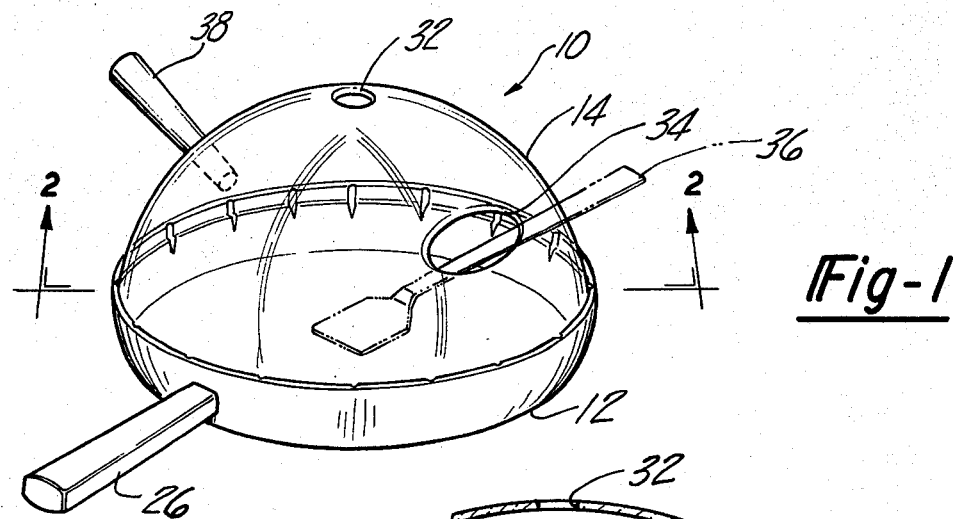
FIG. 1 is a perspective view of a cooking utensil in accordance with the present invention.

Now with reference to the drawing there is depicted therein a cooking utensil such as a frying pan generally indicated at 10, in accordance with the present invention.

The utensil 10 hereof comprises a base or bottom member 12 and a lid or dome 14. The base member 12 comprises a bottom plate 16 which seats atop a burner, grate or the like of a stove or other heat source for cooking foodstuffs.

An upstanding side wall 18 is integrally formed with the bottom plate 16 at the outer terminus thereof. The side wall 18 terminates at a free edge 20, as shown.

Figure 2:
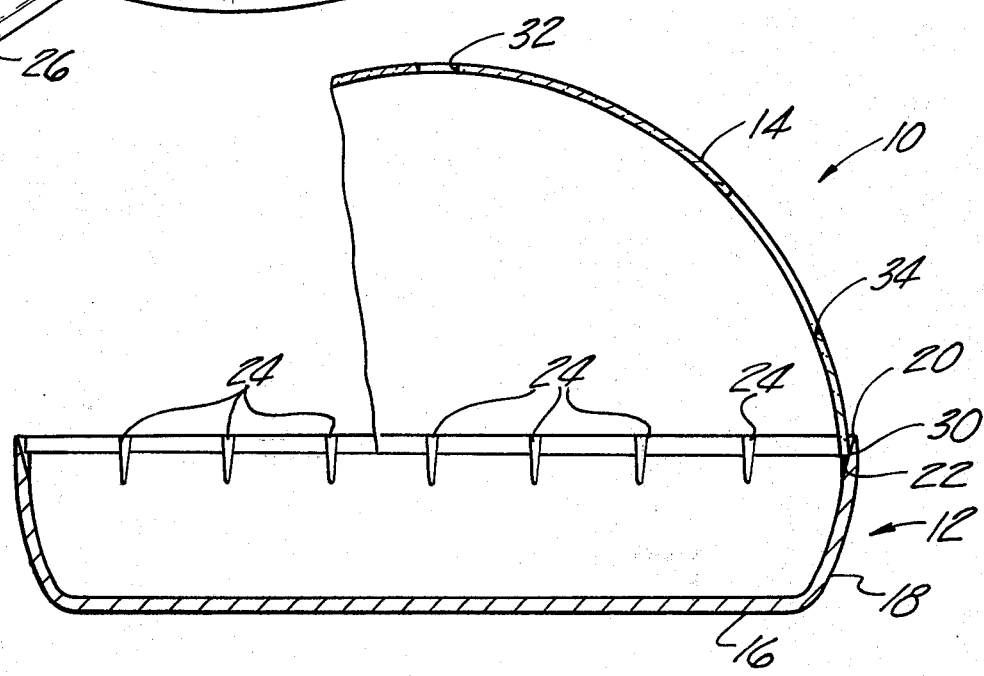
FIG. 2 is a cross-sectional view of the utensil hereof taken along the line 2—2 of FIG. 1.

As clearly shown in FIG. 2, the upstanding side wall 18 has a reduced cross-section proximate the free edge 20. The reduced cross-section defines an inner peripheral ridge of seat or shoulder 22. As explained subsequently, the lid 14 seats on the seat 22.

In accordance herewith at least one aperture 24, and, preferably, a plurality of apertures 24 are circumferentially disposed about the bottom member 12. The aperture 24 permits the introduction of air into the interior space 26 defined by the enclosure between the bottom member 12 and the lid 24. The air entering thereinto is at a lower temperature than that of the interior space 26. Thus, the entering air functions to cool down the cooking oils and greases.

Figure 3:
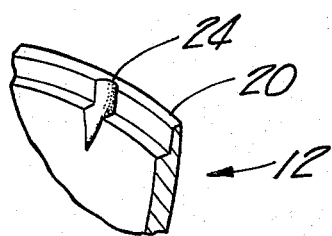
FIG. 3 is a broken perspective view of the bottom member of the utensil hereof.

As shown in FIG. 3 the aperture 24 is formed such that it extends from the free edge 20 of the side wall 18 through the ridge 22 and partially into the side wall 18. Thus, the aperture extends downwardly and is inclined toward the center of the bottom member 12. Preferably, the plurality of apertures 24 are similarly configured and are equidistantly spaced about the periphery of the bottom member 12, as shown.

Because of the disposition of the apertures, which open to the atmosphere exteriorly of the bottom edge of the lid 14, as air enters through the apertures into the interior space 26, it flows past the bottom edge of the lid, thereby cooling same. Thus, the apertures function to cool the interior space, the hot cooking oils and the lid.

In order to facilitate handling of the bottom member 12, grasping means or handle 28 is secured thereto. The handle is secured to the side wall 18 and extends laterally away therefrom. The handle is secured to the side wall 18 by any suitable means such as threaded fasteners or the like (not shown) or can be integrally formed therewith.

The present invention, as noted, also, includes a dome of lid 14. The lid 14 is adapted to removably seat on the interior ridge 22 formed in the side wall 18. Thus, the lid 14 is dimensioned such that its free edge 30 seats on the ridge 22.

The lid 14 is provided with a central or apical vent 32. The vent 32 defines means for escapement of the hot gasses or atmosphere contained within the interior space 26. The lid 14 also includes a lateral opening 34 for inserting thereinto a food turner or stirrer, such as spatula 36.

By providing the lateral opening 34 the user of the utensil 10 is maintained away from the interior space 26, thereby obviating the possibility of grease burns and the like.

To facilitate removability of the lid 14 a grasping means or handle 38 is integrally formed therewith and extends laterally away therefrom.

In practicing the present invention it is preferred that the lid 14 be arcuate in nature, as depicted in the drawing, to provide a substantial surface for condensation of the hot moisture emanating from the bottom member.

It should further be noted that in practicing the present invention, although not shown, a heating coil and rheostatic control could be incorporated herein, in a conventional manner, to provide an electric frying pan.

The utensil hereof can be fabricated from any suitable materials such as heavy gauge aluminum, steel, unbreakable glass compositions and the like. However, it is preferred that the lid be fabricated of glass to permit visual observation of the contents within the utensil.

Having, thus, described the invention what is claimed is:

1. A cooking utensil, comprising:
   a. a bottom member, the bottom member comprising a bottom plate and an upstanding side wall integrally formed with the bottom plate, the side wall terminating at an upper edge, the side wall having at least one aperture formed therethrough, the aperture opening into communication with the interior of the bottom member as defined by the side wall and the bottom plate,
   b. a shoulder formed on the interior of the side wall and extending completely around the periphery thereof, the aperture extending through the ridge,
   c. a lid which seats on the ridge, the lid having a first opening provided therein which defines a vent, and
   wherein the aperture is downwardly inclined toward the center of the bottom plate such that it extends from the free edge of the side wall through the shoulder and partially into the side wall.
2. The utensil of claim 1 wherein the lid further includes a lateral opening for inserting a food turner therethrough.
3. The utensil of claim 1 which further comprises:
   a. means for grasping the lid, and
   b. means for grasping the bottom member.
4. The utensil of claim 1 wherein the side wall is substantially circular, the utensil having a plurality of apertures circumferentially disposed around and formed through the side wall.
5. The utensil of claim 4 wherein the apertures are latitudinally aligned.
6. The utensil of claim 1 wherein:
   a. the side wall has a plurality of apertures formed therearound and extending through the ridge, and
   b. the lid seats on the ridge and further includes a lateral opening for inserting a food turner therethrough.
7. A bottom member for a cooking utensil, comprising:
   a. a bottom plate,
   b. an upstanding side wall integrally formed with the bottom plate, the side wall terminating at an upper free edge, the side wall having at least one aperture formed therethrough, the aperture opening into communication with the interior of the bottom member as defined by the side wall and the bottom plate,
   c. a shoulder formed on the interior of the side wall for seating a cooking utensil lid thereon, and
   wherein the aperture is downwardly inclined toward the center of the bottom plate such that it extends from the free edge of the sidewall through the shoulder and partially into the side wall.

* * * * *